United States Patent
Li et al.

(10) Patent No.: US 11,956,750 B2
(45) Date of Patent: Apr. 9, 2024

(54) COMMUNICATION METHOD FOR CONTROLLING PACKET DATA UNIT SESSION

(71) Applicant: ZTE CORPORATION, Guangdong (CN)

(72) Inventors: Zhijun Li, Shenzhen (CN); Xingyue Zhou, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/848,904

(22) Filed: Jun. 24, 2022

(65) Prior Publication Data

US 2022/0400460 A1 Dec. 15, 2022

Related U.S. Application Data

(63) Continuation of application No. PCT/CN2019/128146, filed on Dec. 25, 2019.

(51) Int. Cl.
*H04W 60/04* (2009.01)
*H04W 60/06* (2009.01)
*H04W 76/30* (2018.01)

(52) U.S. Cl.
CPC ......... *H04W 60/04* (2013.01); *H04W 60/06* (2013.01); *H04W 76/30* (2018.02)

(58) Field of Classification Search
None
See application file for complete search history.

(56) References Cited

U.S. PATENT DOCUMENTS

| 2019/0254118 | A1* | 8/2019 | Dao | H04L 67/141 |
| 2020/0128609 | A1* | 4/2020 | Wei | H04W 76/34 |
| 2020/0170055 | A1* | 5/2020 | Dou | H04W 76/12 |
| 2021/0112514 | A1* | 4/2021 | Long | H04W 8/20 |

FOREIGN PATENT DOCUMENTS

| CN | 109429329 A | 3/2019 |
| CN | 110535676 A | 12/2019 |
| WO | WO-2019/160278 A1 | 8/2019 |

OTHER PUBLICATIONS

International Search Report and Written Opinion for PCT Appl. No. PCT/CN2019/128146, dated Sep. 27, 2020 (7 pages).
ZTE, "How to establish the user plane resource in second access for MA-PDU session" 3GPP TSG-SA WG2 Meeting #31, S2-1901989, Feb. 25, 2019, Santa Cruz, Spain (5 pages).

* cited by examiner

*Primary Examiner* — Lonnie V Sweet
(74) *Attorney, Agent, or Firm* — Foley & Lardner LLP

(57) ABSTRACT

A wireless communication method for use in a wireless network function comprises receiving, from a first session management function (SMF) a registration request of a packet data unit (PDU) session corresponding to a second SMF, and transmitting, to the second SMF, a notification which indicates the PDU session is controlled by another SMF.

12 Claims, 7 Drawing Sheets

COMMUNICATION METHOD FOR CONTROLLING PACKET DATA UNIT SESSION

CROSS-REFERENCE TO RELATED APPLICATION

This application claims the benefit of priority under 35 U.S.C. § 120 as a continuation of PCT Patent Application No. PCT/CN2019/128146, filed on Dec. 25, 2019, the disclosure of which is incorporated herein by reference in its entirety.

TECHNICAL FIELD

This disclosure is generally directed to wireless communications.

SUMMARY

FIG. 1 relates to a schematic architecture of a 5G system. The 5G system architecture comprises a user equipment (UE), a radio access network (RAN), i.e. a new radio (NR) base station, and the following network functions (NF) which interact via interfaces N1 to N9, N11, N14 and N15.

Access and Mobility Management function (AMF): The AMF includes the following functionalities: registration management, connection management, reachability management and mobility management. The AMF also performs an access authentication and an access authorization. The AMF is a non access stratum (NAS) security termination and relays the structural-to-modular NAS (SM NAS) between the UE and the SMF, etc.

Session Management Function (SMF): The SMF includes the following functionalities: session establishment, modification and release, UE internet protocol (IP) address allocation & management (including optional authorization functions), selection and control of user plane function (UPF), downlink data notification, etc. The SMF controls the UPF via the interface N4.

User Plane Function (UPF): The UPF includes the following functionalities: serving as an anchor point for intra-/inter-radio access technology (RAT) mobility, packet routing & forwarding, traffic usage reporting, quality of service (QoS) handling for the user plane, downlink packet buffering and downlink data notification triggering, etc. The UPF may be deployed as an intermediate UPF (I-UPF) or a packet data unit (PDU) session anchor (PSA). The PSA/UPF is a UPF terminating the N6 interface towards a data network. The I-UPF provides traffic forwarding between the RAN and PSA/UPF. The I-UPF may support "ULCL" (uplink classifier offloading uplink traffic based on target IP address) or "BP" (branching point offloading uplink traffic based on source IP address) to offload some traffics to local PSA/UPF.

Policy Control Function (PCF): The PCF provides QoS policy rules to control plane functions to enforce the rules. The PCF transforms application function (AF) requests into policies that apply to the PDU sessions. The PCF provides the AF influenced traffic steering enforcement control in policy and charging control (PCC) rules to the SMF, so as to allow the SMF to establish a data path for offloading the traffic to local data network.

Application Function (AF): The AF interacts with the $3^{rd}$ generation partner project (3GPP) core network in order to provide services, for example to support application influence on traffic routing. Based on operator deployment, the AFs considered to be trusted by the operator can be allowed to interact directly with relevant NFs. The AFs which is not allowed by the operator to directly access network functions shall use the external exposure framework via a network exposure function (NEF) to interact with relevant network functions.

This disclosure relates to methods, systems, and devices for controlling packet data unit, PDU, sessions, in particular to methods, systems and devices for establishing and/or releasing the PDU sessions.

The present disclosure relates to a wireless communication method for in a wireless network function. The wireless communication method comprises:

receiving, from a first session management function, SMF, a registration request of a packet data unit, PDU, session corresponding to a second SMF, and transmitting, to the second SMF, a notification which indicates the PDU session is controlled by another SMF.

Various embodiments may preferably implement the following features:

Preferably, the wireless communication method further comprises changing a registration context of the PDU session from indicating the second SMF to indicating the first SMF, wherein the notification indicates the registration context of the PDU session is changed from indicating the second SMF to indicating another SMF.

Preferably, the notification indicates the second SMF to release the PDU session.

Preferably, the notification relates to an SMF registration event associated to the PDU session and comprises an identification, ID, of the PDU session, a data network name, DNN, an ID of the first SMF.

Preferably, the notification further comprises a multi-access PDU, MA-PDU, indication of the registration request for indicating the PDU session being an MA-PDU session.

Preferably, the wireless communication method further comprises receiving, from the second SMF, a subscription request for subscribing the notification related to the SMF registration event.

Preferably, the notification is an SMF deregistration notification which indicates that the PDU session needs to be released or that the PDU session is downgraded from an MA-PDU session to a single access PDU, SA-PDU, session.

Preferably, the wireless network function comprises a unified data management, UDM, function.

The present disclosure also relates to a wireless communication method for use in a third session management function, SMF. The wireless communication method comprises:

receiving, from a unified data management, UDM, function, a notification which indicates that a packet data session, PDU, of the third SMF is controlled by another SMF, and releasing the PDU session based on the notification.

Various embodiments may preferably implement the following features:

Preferably, the notification indicates a registration context of the PDU session being changed from indicating the third SMF to indicating another SMF.

Preferably, the notification relates to an SMF registration event associated to the PDU session and comprises an identification, ID, of the PDU session, a data network name, DNN, an ID of a fourth SMF.

Preferably, the notification further comprises a multi-access PDU, MA-PDU, indication of the registration request for indicating the PDU session being a multi-access PDU, MA-PDU, session.

Preferably, the wireless communication method further comprises transmitting, to the UDM function, a subscription request for subscribing the notification related to the SMF registration event.

Preferably, the notification is an SMF deregistration notification which indicates the PDU session needing to be released or the PDU session being downgraded from an MA-PDU session to a single access PDU, SA-PDU, session.

The present disclosure relates to a wireless communication method for use in a wireless network function. The wireless communication method comprises:
- receiving, from a fifth session management function, SMF, an indication which indicates whether a packet data unit, PDU, session corresponding to the fifth SMF is a multi-access PDU, MA-PDU, session,
- storing the indication received from the fifth SMF in a registration context of the PDU session,
- receiving, from a sixth SMF, a registration request corresponding to the PDU session, and
- determining whether to accept the registration request based on the indication stored in context of the PDU session and the registration request from the sixth SMF.

Various embodiments may preferably implement the following features:

Preferably, the indication comprises at least one of an MA-PDU indication or an MA-PDU downgrade allowed indication, the MA-PDU indication indicates the PDU session being an MA-PDU session, and the MA-PDU downgrade indication indicates the PDU session being able to be changed to from an MA-PDU session to a single-access PDU, SA-PDU session.

Preferably, the wireless communication method further comprises transmitting, to the fifth SMF, data network name, DNN, configuration data used for determining the indication.

Preferably, the indication indicates the PDU session being an MA-PDU session, the registration request from the sixth SMF indicates an SA-PDU session, the wireless network function determines the PDU session being able to be changed from an MA-PDU session to an SA-PDU session and the wireless network function accepts the registration request from the sixth SMF.

Preferably, the indication indicates the PDU session being an MA-PDU session, the registration request from the sixth SMF indicates an SA-PDU session, the wireless network function determines the PDU session not being able to be changed from an MA-PDU session to an SA-PDU session and the wireless network function rejecting the registration request from the sixth SMF.

Preferably, the registration request does not comprise an MA-PDU indication, which indicates the PDU session being an SA-PDU session.

Preferably, the wireless network function determines whether the PDU session is able to be changed from an MA-PDU session to an SA-PDU session based on at least one of a network configuration or DNN configuration data of the wireless network function.

Preferably, the wireless network function determines whether the PDU session is able to be changed from an MA-PDU session to an SA-PDU session based on the indication.

Preferably, the wireless network function accepts the registration request and the wireless communication method further comprises transmitting, to the fifth SMF, a notification which indicates the PDU session is controlled by another SMF.

Preferably, the wireless communication method further comprises changing a registration context of the PDU session from indicating the fifth SMF to indicating the sixth SMF, wherein the notification indicates the registration context of the PDU session is changed from indicating the fifth SMF to indicating another SMF.

Preferably, the notification indicates the fifth SMF to release the PDU session.

Preferably, the notification relates to an SMF registration event associated to the PDU session and comprises an identification, ID, of the PDU session, a DNN, and an ID of the sixth SMF.

Preferably, the notification further comprises an MA-PDU indication of the registration request for indicating the PDU session being an MA-PDU session.

Preferably, the wireless communication method further comprises receiving, from the fifth SMF, a subscription request for subscribing the notification related to the SMF registration event of the PDU session.

Preferably, the notification is an SMF deregistration notification which indicates the PDU needing to be released or the PDU session being downgraded from an MA-PDU session to an SA-PDU session.

Preferably, the wireless network function comprises a unified data management, UDM, function.

The present disclosure relates to a wireless communication method for use in a seventh session management function, SMF. The wireless communication method comprises transmitting, to a unified data management, UDM, function, an indication which indicates whether a packet data unit, PDU, session corresponding to the seventh SMF is a multi-access PDU, MA-PDU, session.

Various embodiments may preferably implement the following features:

Preferably, the indication comprises at least one of an MA-PDU indication or an MA-PDU downgrade allowed indication, the MA-PDU indication indicates the PDU session being an MA-PDU session, and the MA-PDU downgrade indication indicates the PDU session being able to be changed to from an MA-PDU session to a single-access PDU, SA-PDU, session.

Preferably, the wireless communication method further comprises receiving, from the UDM function, data network name, DNN, configuration data used for determining the indication.

Preferably, the wireless communication method further comprises receiving, from the UDM function, a notification which indicates the PDU session being controlled by another SMF, and releasing the PDU session based on the notification.

Preferably, the notification indicates a registration context of the PDU session being changed from indicating the seventh SMF to indicating another SMF.

Preferably, the notification relates to an SMF registration event associated to the PDU session and comprises an identification, ID, of the PDU session, a DNN, and an ID of an eighth SMF.

Preferably, the notification further comprises an MA-PDU indication of the registration request for indicating the PDU session being an MA-PDU session.

Preferably, the wireless communication method further comprises transmitting, to the UDM function, a subscription for subscribing the notification related to the SMF registration event.

Preferably, the notification is an SMF deregistration notification which indicates that the PDU session needing to be released or that the PDU session being downgraded from an MA-PDU session to an SA-PDU session.

The present disclosure relates to a wireless network function. The wireless network function comprises a communication unit, configured to receive, from a first session management function, SMF, a registration request of a packet data unit, PDU, session corresponding to a second SMF, and transmit, to the second SMF, a notification which indicates the PDU session is controlled by another SMF.

Various embodiments may preferably implement the following feature:

Preferably, the wireless network function further comprises a processor being configured to perform a wireless communication method of any of the foregoing described methods.

The present disclosure relates to a session management function, SMF. The SMF comprises a communication unit, configured to receive, from a unified data management, UDM, function, a notification which indicates that a packet data session, PDU, of the SMF is controlled by another SMF, and a processor, configured to release the PDU session based on the notification.

Various embodiments may preferably implement the following feature:

Preferably, the processor is further configured to perform a wireless communication method of any of the foregoing described methods.

The present disclosure relates to a wireless network function. The wireless network function comprises:

a communication unit, configured to receive, from a fifth session management function, SMF, an indication which indicates whether a packet data unit, PDU, session corresponding to the fifth SMF is a multi-access PDU, MA-PDU, session, and to receive, from a sixth SMF, a registration request corresponding to the PDU session, and a processor, configured to store the indication received from the fifth SMF in a registration context of the PDU session, and to determine whether to accept the registration request based on the indication stored in context of the PDU session and the registration request from the sixth SMF.

Various embodiments may preferably implement the following feature:

Preferably, the processor is further configured to perform a wireless communication method of any of the foregoing described methods.

The present disclosure relates to a session management function, SMF. The SMF comprises a communication unit, configured transmit, to a unified data management, UDM, function, an indication which indicates whether a packet data unit, PDU, session corresponding to the SMF is a multi-access PDU, MA-PDU, session.

Various embodiments may preferably implement the following feature:

Preferably, the SMF further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
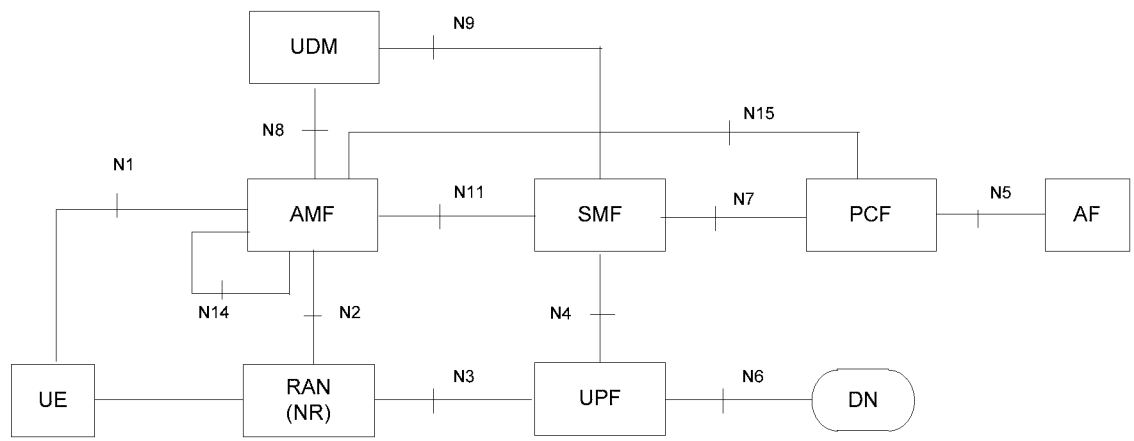
FIG. 1 shows a schematic architecture of a 5G system
Figure 2:
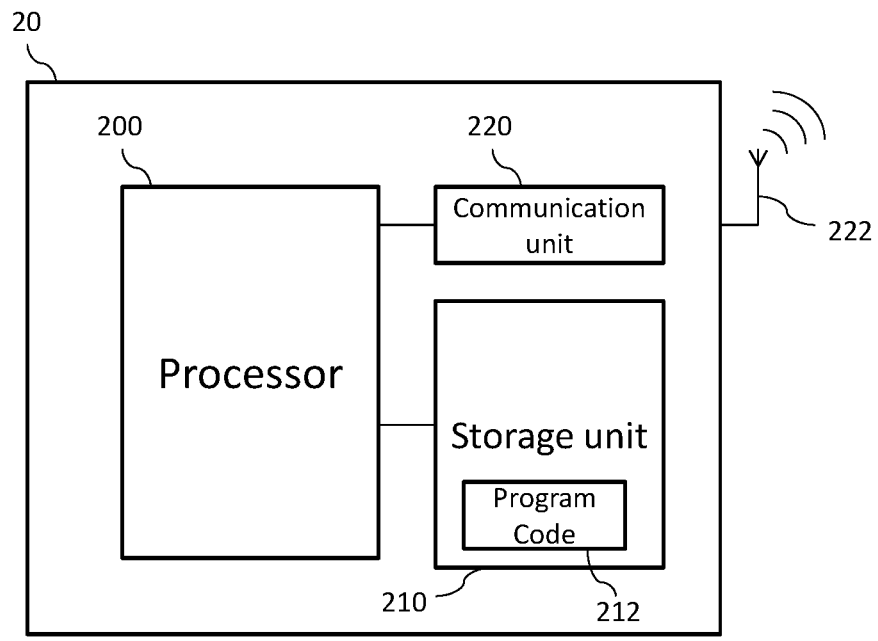
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may be a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
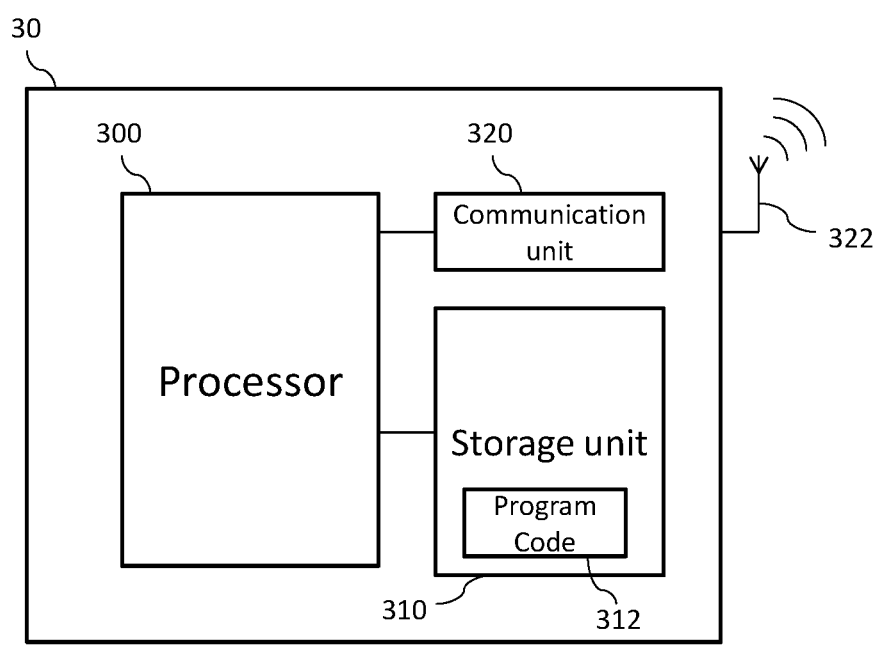
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), a Serving Gateway (S-GW), Packet Data Network (PDN) Gateway (P-GW), or a Radio Network Controller (RNC). In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment) or another wireless network node.

The 5G system allows a packet data unit (PDU) session to be established via multiple accesses, i.e. via both 3GPP access and Non-3GPP access. The PDU session allowed to be established via more than one access type is called Multi-Access PDU session, i.e. MA-PDU session.

Figure 4:
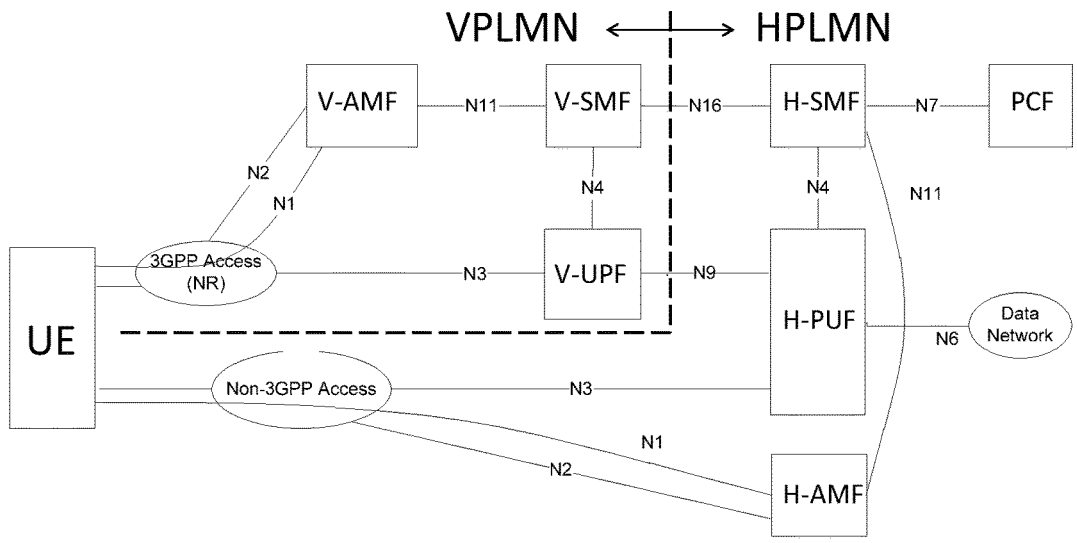
FIG. 4 shows an example of a 5G architecture of supporting the MA-PDU session in the roaming scenario according to an embodiment of the present disclosure.

Before establishing the MA-PDU, the UE is not required to register to the 5G core network via both the 3GPP access and the Non-3GPP access. Furthermore, in a roaming scenario, the 3GPP access and the Non-3GPP access might belong to different public land mobile networks (PLMNs), e.g. a home PLMN (HPLMN) and a visitor PLMN (VPLMN). FIG. 4 shows an example of a 5G architecture of supporting the MA-PDU session in roaming (e.g. Home-Routed roaming) scenario according to an embodiment of the present disclosure. In FIG. 4, an HPLMN has its own SMF H-SMF (H-SMF hereinafter), PUF H-UPF ((H-UPF hereinafter)) and AMF H-AMF (H-AMF hereinafter). Similarly, a VPLMN has its own SMF V-SMF (V-SMF hereinafter), UPF V-UPF (V-UPF hereinafter) and AMF V-AMF (V-AMF hereinafter). As shown in FIG. 4, the UE registers to the HPLMN via the non-3GPP access and registers to the VPLMN via the 3GPP access. In order to get an internet protocol (IP) service, a PDU session may be established in response to a request of the UE.

Figure 5A:
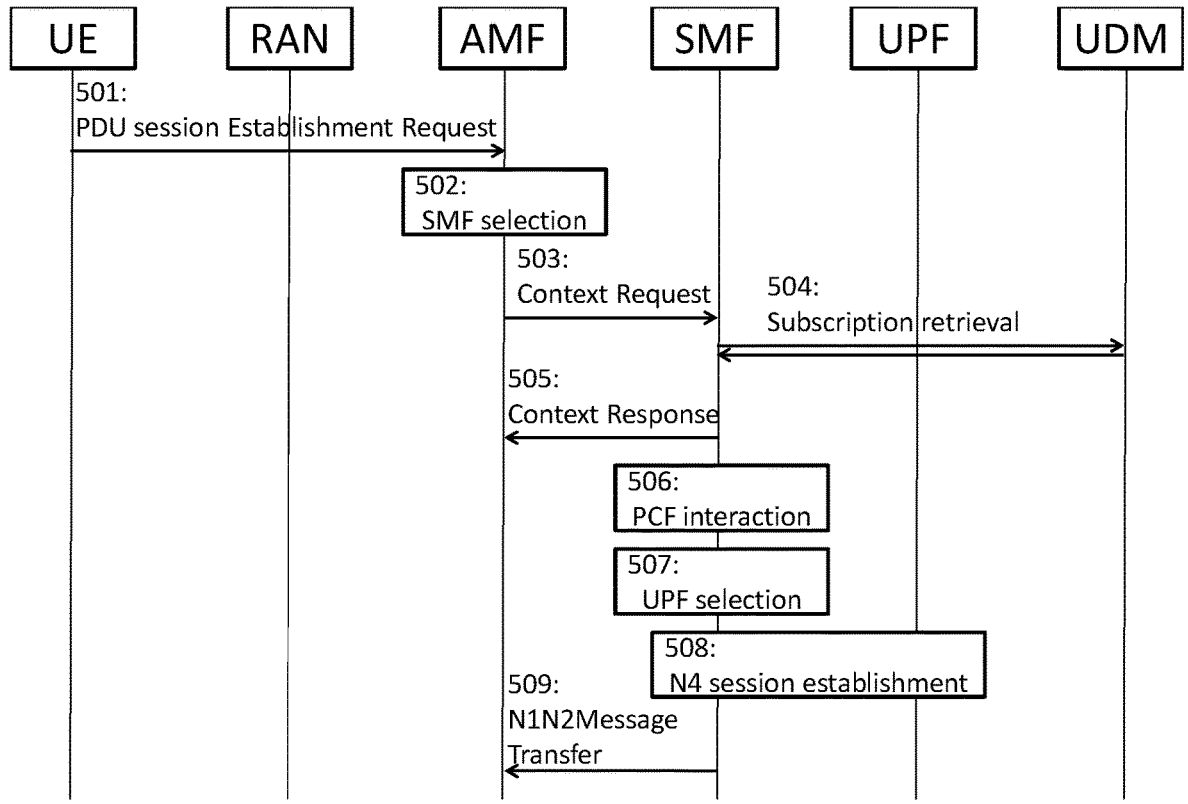
FIGS. 5A and 5B show an example of a PDU session establishment procedure according to an embodiment of the present disclosure.
Figure 5B:
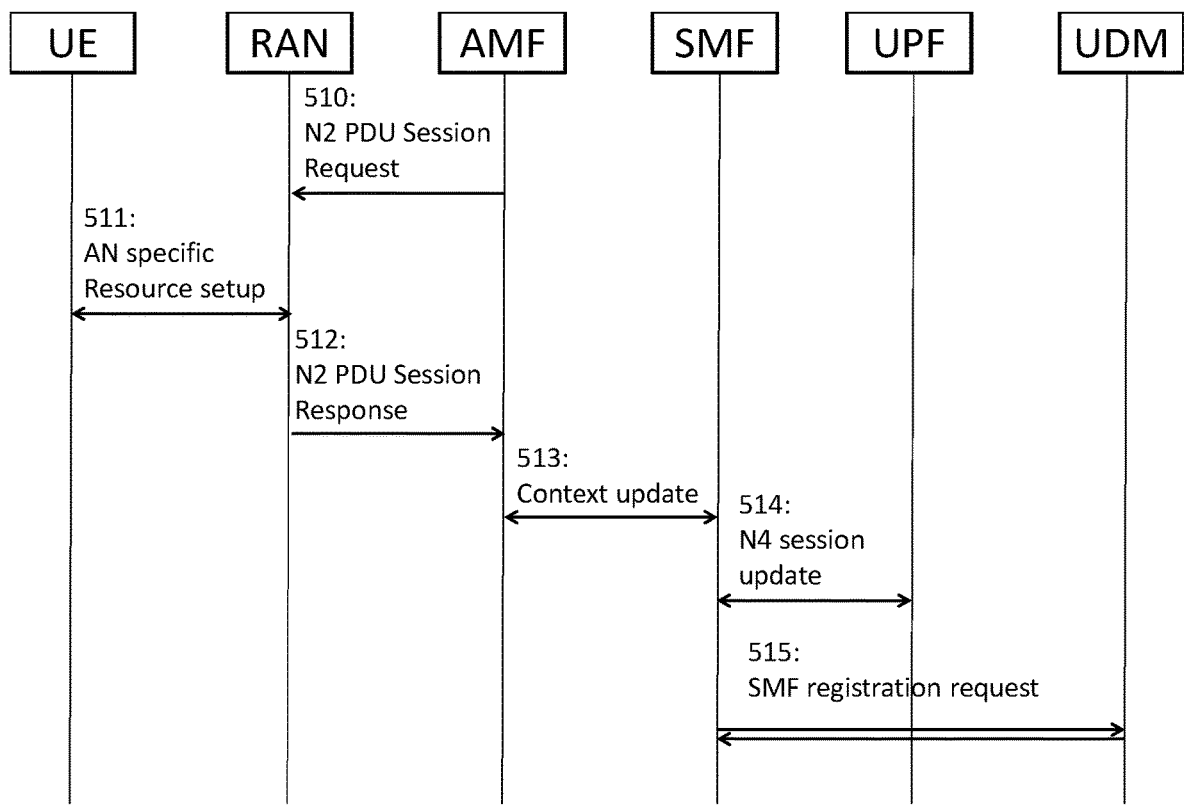

FIGS. 5A and 5B show an example of a PDU session establishment procedure according to an embodiment of the present disclosure. The PDU session establishment procedure may be performed in a 5G communication system and comprises the following steps:

Step 501: In order to establish a new PDU session, the UE generates a new PDU session identification (ID) and initiates the (UE requested) PDU session establishment procedure by transmitting a non access stratum (NAS) message comprising a PDU session establishment request within an N1 session management (SM) container. The NAS message may comprise a data network name (DNN), the PDU session ID and the N1 SM container having the PDU session establishment request. The NAS message sent by the UE is encapsulated by the RAN in a N2 message towards the AMF.

Step 502: The AMF selects an SMF based on the requested DNN and other information.

Step 503: The AMF sends a context request (e.g. a Nsmf_PDUSession_CreateSMContext Request) to the selected SMF. The context request may comprise a subscriber permanent identifier (SUPI), the DNN, the PDU session ID, the AMF ID, N1 SM container (PDU session establishment request). The SUPI uniquely identifies the UE's subscription. The AMF ID is the UE's globally unique AMF ID (GUAMI) which uniquely identifies the AMF serving the UE. The AMF forwards the PDU session ID together with the N1 SM container comprising the PDU session establishment request received from the UE.

Step 504: The SMF sends a request (e.g Nudm_SDM_Get request) to the UDM, to retrieve session management subscription data. The UDM sends back the requested data in a response message.

Step 505: If the SMF is able to process the PDU session establishment request, the SMF creates an SM context and responds to the AMF by providing an SM context identifier in a context response (e.g. Nsmf_PDUSession_CreateSMContext response).

Step 506: The SMF may interact with a PCF (not shown in FIGS. 5A and 5B) to perform a policy and charging control (PCC) authorization.

Step 507: The SMF selects a UPF based on the DNN and other information.

Step 508: The SMF sends an N4 session establishment request to the UPF to establish an N4 session. The SMF provides packet detection, enforcement and reporting rules to be installed on the UPF for this PDU Session. If core network (CN) tunnel information is allocated by the SMF, the CN Tunnel Info is provided to UPF in this step. The UPF acknowledges by sending an N4 Session Establishment Response. If the CN tunnel information is allocated by the UPF, the CN tunnel information is provided to the SMF in this step.

Step 509: The SMF transmits a message (e.g. Namf_Communication_N1N2MessageTransfer) to the AMF, wherein this message comprises the PDU session ID, an N2 SM information (comprising the PDU session ID, quality of service (QoS) profile(s), QoS flow identifier(s)

(QFI(s)), and N3 CN Tunnel Info), and an N1 SM container. Specifically, the N2 SM information carries information that the AMF shall forward to the RAN which includes the N3 CN Tunnel Info corresponds to the CN address of the N3 tunnel corresponding to the PDU session, the QoS profiles and the corresponding QFI and the PDU Session ID. The N1 SM container in this step comprises a PDU session establishment accept that the AMF shall provide to the UE.

Step 510: The AMF transmits an N2 PDU session request comprising the N2 SM information, an NAS message (PDU Session ID, the N1 SM container comprising the PDU Session Establishment Accept) to the RAN. Specifically, the AMF sends the NAS message containing the PDU session ID and the PDU session establishment accept targeted to the UE and the N2 SM information received from the SMF within the N2 PDU session request to the RAN.

Step 511: The RAN may issue an AN specific signalling exchange with the UE that is related with the information received from the SMF. For example, in a 3GPP RAN, an RRC connection reconfiguration may take place with the UE establishing the necessary RAN resources related to the QoS rules for the PDU session request. The RAN forwards the NAS message (comprising the PDU session ID and the N1 SM container with the PDU session establishment accept) to the UE. The RAN also allocates AN N3 tunnel information for the PDU session.

Step 512: The RAN transmits an N2 PDU session response to the AMF, wherein the N2 PDU session response comprises the PDU session ID, a cause, N2 SM information with the PDU session ID, AN tunnel information, and a list of accepted/rejected QFI(s). The AN tunnel information corresponds to the AN address of the N3 tunnel corresponding to the PDU session.

Step 513: The AMF transmits a context request (e.g. Nsmf_PDUSession_UpdateSMContext request) with N2 SM information to the SMF. The AMF forwards the N2 SM information received from RAN to the SMF. If the list of rejected QFI(s) is included in the N2 SM information, the SMF shall release QoS profiles associated to the rejected QFI(s).

Step 514: The SMF initiates an N4 Session modification procedure with the UPF (e.g. PSA/UPF0). The SMF provides the AN tunnel information to the UPF as well as the corresponding forwarding rules.

Step 515: The SMF transmits an SMF registration request (e.g. Nudm_UECM_Registration Request) to the UDM, wherein the SMF registration request comprises the PDU Session ID, the SMF Instance ID, the DNN and a PLMN ID. If the UDM accepts the SMF registration request, the UDM stores the SMF registration context and sends a response message to the SMF.

After the PDU session has been successfully established, the UE is allocated with the IP address. With the allocated IP address, the UE is able to start IP communications with any other IP remote side.

When the PDU session is no longer needed, the UE may request to release the PDU session. After PDU session is successfully released, the SMF sends an SMF deregistration request to the UDM, wherein the SMF deregistration request includes the PDU Session ID. If the SMF deregistration request is acceptable, the UDM utilizes the PDU Session ID to locate stored SMF registration context, and removes the stored SMF registration context associated with the PDU Session ID of the SMF deregistration request.

For the MA-PDU session, the UE firstly requests to establish the MA-PDU session from one access, i.e. to set up a first leg of MA-PDU session, and then requests to establish the MA-PDU session from the other access, i.e. to set up a second leg of the MA-PDU session. In the roaming scenario shown in FIG. 4, if the VPLMN does not support the MA-PDU session, problems may occur when UE requests establishing the MA-PDU session.

Figure 6A:
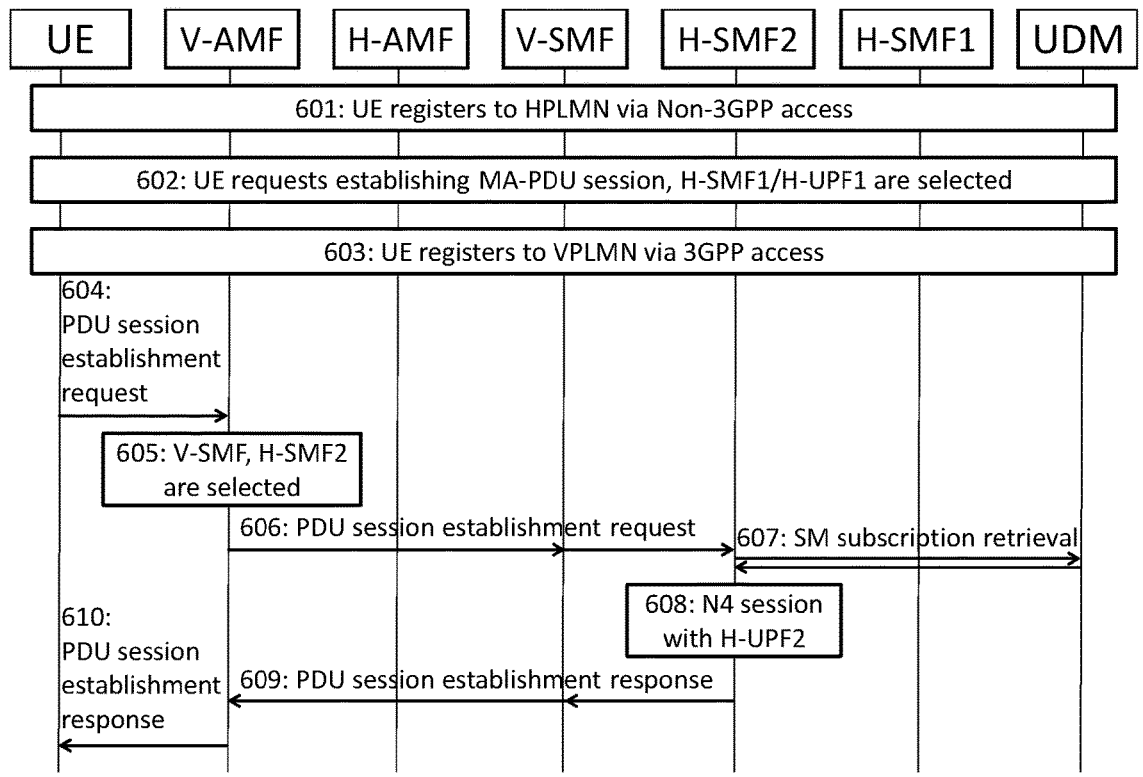
FIGS. 6A and 6B show an example of an MA-PDU session establishment procedure in the roaming scenario according to an embodiment of the present disclosure.
Figure 6B:
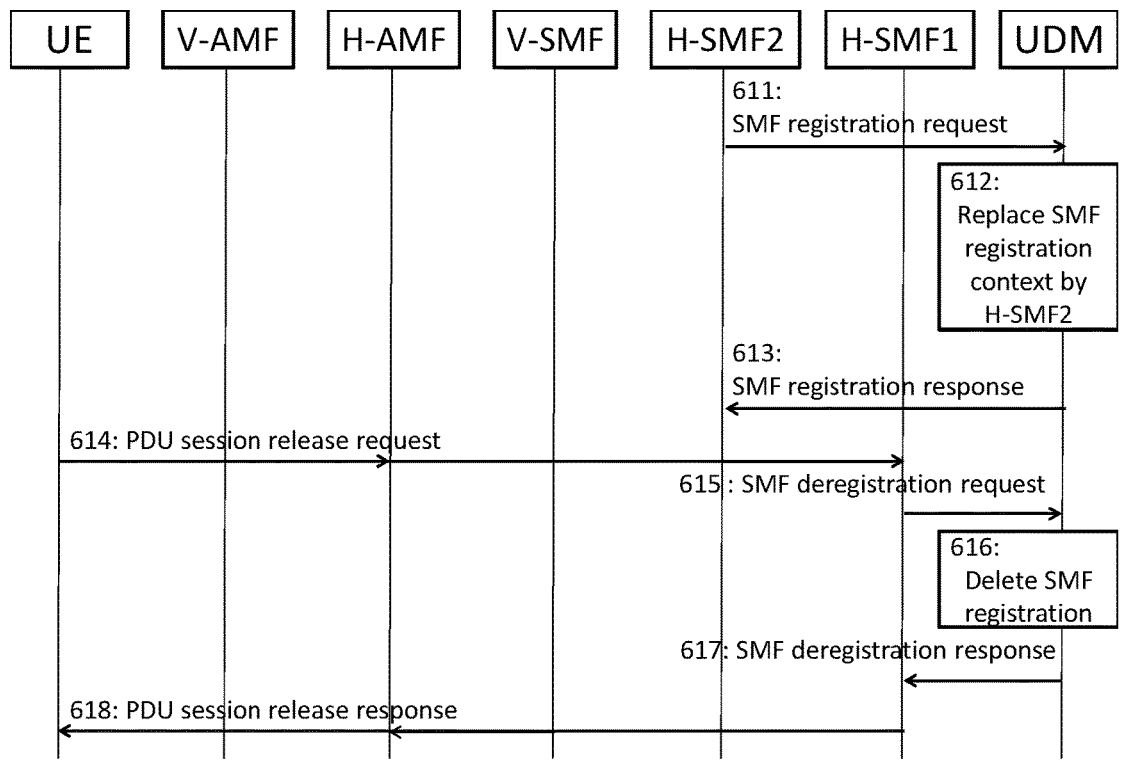

FIGS. 6A and 6B show an example of an MA-PDU session establishment procedure in the roaming scenario according to an embodiment of the present disclosure. In this MA-PDU session establishment procedure, the UE requests the MA-PDU session via the 3GPP access and Non-3GPP access separately. For example, the UE firstly registers to the HPLMN via the Non-3GPP access and requests establishing the first leg for the MA-PDU session. Later on, the UE registers to the VPLMN via the 3GPP access and request establishing the second leg for the MA-PDU session. More specifically, the MA-PDU session establishment procedure shown in FIGS. 6A and 6B comprises the following steps:

Step 601: The UE firstly registers to the HPLMN via the Non-3GPP access. The H-AMF performs an AMF registration to the UDM and the UDM stores the AMF registration context.

Step 602: The UE requests establishing the MA-PDU session to the H-AMF.

In step 602, the UE may send a PDU session establishment request to the H-AMF, wherein the PDU session establishment request may comprise a PDU Session ID, a DNN, an MA-PDU requested indication, an N1 SM container comprising the PDU session establishment Request. The MA-PDU requested indication identifies that the requested PDU session is the MA-PDU session, rather than a single-access PDU (SA-PDU) session. The H-AMF selects a proper H-SMF H-SMF1 based on the DNN and other information. The selected H-SMF H-SMF1 shall support the MA-PDU session.

Step 603: The UE registers to the VPLMN via the 3GPP access.

Step 604: The UE sends an MA-PDU session establishment request to the V-AMF. The MA-PDU session in this step carries the existing PDU Session ID and the MA-PDU requested indication, as step 602.

Step 605: Because the VPLMN does not support the MA-PDU session, the V-AMF interprets the MA-PDU session establishment request as an initial PDU session establishment request. Thus, the V-AMF selects a V-SMF and a new H-SMF H-SMF2 based on the DNN and other information.

Step 606: The V-AMF sends a context request (e.g. Nsmf_PDUSession_CreateSMContext Request) to the V-SMF. The context request comprises a SUPI, the DNN, the PDU Session ID, the AMF ID, the N1 SM container comprising the PDU session establishment request. Since the V-AMF does not support the MA-PDU session, the MA-PDU requested indication received from the UE is discarded by the V-AMF. Next, the V-SMF sends a session create request (e.g. Nsmf_PDUSession_Create Request) to the H-SMF H-SMF2, where in the session create request comprises the SUPI, the DNN, the PDU Session ID, the N1 SM container having the PDU session establishment request.

Step 607: The H-SMF H-SMF2 retrieves session management subscription data from the UDM.

Step 608: The H-SMF H-SMF2 selects an H-UPF H-UPF2 and sets up an N4 session for the MA-PDU session.

Step 609: The H-SMF H-SMF2 sends a session create response (e.g. Nsmf_PDUSession_Create response) to the V-SMF. The V-SMF sends a SM context response (e.g. Nsmf_PDUSession_CreateSMContext response) to the V-AMF.

Step 610: The V-AMF sends a PDU session establishment response to the UE and sends an AN message to the RAN (not shown in FIG. 6A) to setup AN specific resources (similar to steps 510 to 512). Note that, because the V-AMF/V-SMF does not support the MA-PDU session, the requested MA-PDU session is established as the SA-PDU session.

Step 611: After the PDU session is established, the H-SMF H-SMF2 sends an SMF registration request (e.g. Nudm_UECM_Registration Request) to the UDM, wherein the SMF registration request comprises the PDU session ID, the DNN, an SMF instance ID, and the PLMN ID. The SMF Instance ID shall be present and contain the NF instance ID of the H-SMF H-SMF2.

Step 612: The UDM accepts the SMF registration request and updates (e.g. changes) the stored SMF registration context with new information from the H-SMF H-SMF2. That is, the UDM may replace (e.g. change) the SMF instance ID in the SMF registration context from the NF Instance ID of the H-SMF H-SMF1 to the NF instance ID of the H-SMF H-SMF2.

Step 613: The UDM sends an SMF registration response to the H-SMF H-SMF2.

Step 614: After the UE receives the PDU session establishment response from the V-AMF, the UE may determine there is no MA-PDU related information included in the PDU session establishment response. Under such a condition, the UE may initiate a PDU session release procedure to release the first leg of MA-PDU session. That is, the UE may trigger the H-SMF H-SMF1 to release the MA-PDU session. In this embodiment, the UE sends a PDU session release request with the PDU session ID to the H-AMF, to request releasing of the first leg of the MA-PDU session in the Non-3GPP side.

Step 615: In the PDU session release procedure, the H-SMF H-SMF1 sends an SMF deregistration request to the UDM, wherein the SMF deregistration comprises the PDU session ID.

Step 616: When receiving the SMF deregistration from the H-SMF H-SMF1, the UDM finds the SMF registration context associated with the PDU Session ID and removes the SMF registration context from the UDM. Note that, the removed SMF registration context is actually associated with the H-SMF H-SMF2. In other words, the triggered PDU session release procedure actually removes the SMF registration of the H-SMF H-SMF2.

Step 617: The UDM sends an SMF deregistration response to the H-SMF H-SMF1.

Step 618: The H-SMF H-SMF1 releases the resources of the MA-PDU session and sends a PDU session release response to the UE.

As can be seen from FIGS. 6A and 6B, the UE initiates the PDU session release procedure from step 614 to step 618 and results that there is no SMF registration in the UDM for the PDU session. As a result, any UDM initiated interaction (e.g. Notification of SM subscription changes, subscribes specific events from SMF, collects statistic info (e.g. trace info) from SMF) with the SMF would fail.

Furthermore, in the FIGS. 6A and 6B, the H-SMF H-SMF2 accepts the UE's PDU session request and establishes the SA PDU session for the PDU session request, which means the MA-PDU session previously established at the first access (e.g. the Non-3GPP access) is now downgraded to the SA-PDU session at the second access (e.g. the 3GPP access). However, the MA-PDU session may not be allowed (able) to be downgraded to the SA-PDU session. In other words, the MA-PDU session establishment procedure shown in FIGS. 6A and 6B may fail.

In order to avoid the above issues, the UDM may transmit a notification to the H-SMF H-SMF1 after receiving the registration request of the PDU session from the H-SMF H-SMF2 in an embodiment of the present disclosure. The notification is configured to indicate the H-SMF H-SMF1 that the registration request of the PDU session is received from the H-SMF H-SMF2, that the registration context is changed from indicating the H-SMF H-SMF1 to indicating the H-SMF H-SMF2 or that the PDU session is controlled by another SMF (e.g. the H-SMF H-SMF2). Based on the notification, the H-SMF H-SMF1 may release the PDU session (i.e. the first leg of the MA-PDU session established for the UE) at its own side without transmitting the SMF deregistration request to the UDM. As a result, the SMF registration of the PDU session is still stored in the UDM.

Figure 7A:
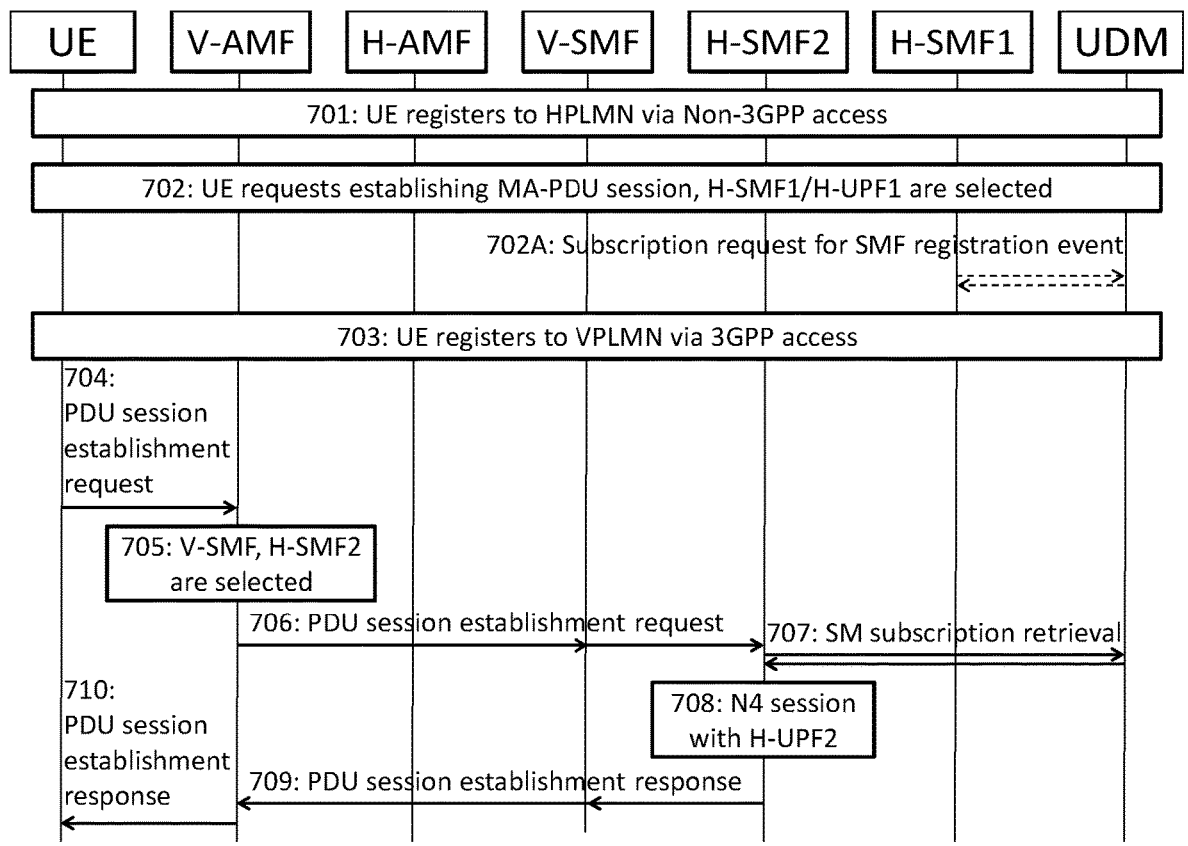
FIGS. 7A and 7B show an example of an MA-PDU session establishment procedure in the roaming scenario according to an embodiment of the present disclosure.
Figure 7B:
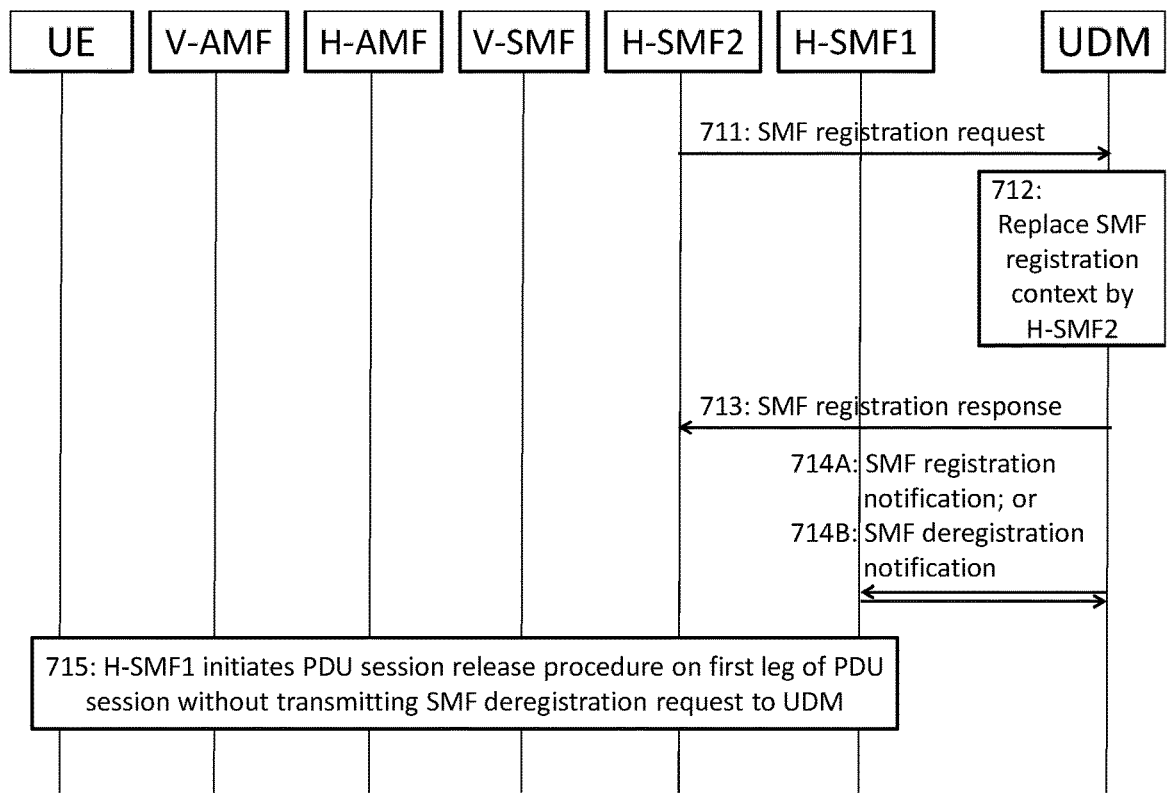

FIGS. 7A and 7B show an example of an MA-PDU session establishment procedure according to an embodiment of the present disclosure. In this embodiment, operations of steps 701 to 713 are similar to those of steps 601 to 613 shown in FIGS. 6A and 6B and are not described herein for brevity. In an embodiment, the UDM may be configured, by a local policy, to always accept the SMF registration from SMFs (e.g. H-SMF H-SMF2) in step 712, e.g., because the HPLMN supports the MA-PDU session.

In the embodiment shown in FIGS. 7A and 7B, after an SMF registration event associated to the PDU session occurs (e.g. receiving the SMF registration request from the H-SMF H-SMF2 (step 711), changing the SMF registration context from indicating the H-SMF H-SMF1 to indicating the H-SMF H-SMF2 (step 712) or transmitting the SMF registration response to the H-SMF H-SMF2 (step 713)), the UDM transmits a notification to the H-SMF H-SMF1 to indicate that the PDU session is controlled by another SMF (e.g. H-SMF H-SMF2). In an example, the notification may be an SMF registration notification relating to the SMF registration event (step 714A) or an SMF deregistration notification (step 714B).

In an embodiment, the SMF registration notification of step 714A is configured to indicate the SMF registration event associated to the PDU session occurs. The SMF registration notification may comprise information related to the H-SMF H-SMF2. For example, the SMF registration notification may comprise the PDU session ID, the DNN and the SMF instance ID (i.e. the NF instance ID of the H-SMF H-SMF2). In an example, the SMF registration notification may further comprise an MA-PDU indication when the MA-PDU indication is provided in the SMF registration request from the H-SMF H-SMF2. In some other scenarios which are not limited to the abovementioned problematic case, the control of an MA-PDU session might be handed over to another H-SMF which also supports the MA-PDU (e.g. from the H-SMF H-SMF1 to the H-SMF H-SMF2 supporting the MA-PDU) and the H-SMF H-SMF2 may include the MA-PDU indication to the UDM in the SMF registration request. Thus, the SMF registration notification transmitted to the H-SMF H-SMF1 may include an MA-PDU indication.

In an embodiment, the SMF deregistration notification of step 714B indicates that the PDU session needs to be released or that the PDU session is downgraded from an MA-PDU session to an SA-PDU session. In an example, the SMF deregistration notification may comprise a deregistration reason. For example, the deregistration reason may be "NEW_SMF_REGISTRATION" indicating a new SMF registration of the PDU session occurs or "MA_PDU_DOWNGRADE" indicating the PDU session downgrades (changes) from an MA-PDU session to an SA-PDU session.

In step 715, after receiving either the SMF registration notification of step 714A or the SMF deregistration notification of step 714B, the H-SMF H-SMF1 initiates a PDU session release procedure to release the PDU session established in step 702 (i.e. the first leg of the PDU session). Note that, the H-SMF H-SMF1 does not transmit the SMF deregistration request to the UDM. Therefore, the SMF registration context of the PDU session is not removed from and is still stored in the UDM.

In an embodiment, the H-SMF H-SMF1 may transmit a subscription request to the UDM, to subscribe a notification related to the SMF registration event associated to the PDU session (e.g. the SMF registration notification of step 714A). For example, the H-SMF H-SMF1 may transmit such subscription request in step 702A shown in FIG. 7A. That is, after the UE establishes the PDU session with the HPLMN, the H-SMF H-SMF1 transmits the subscription request to the UDM, to subscribe the SMF registration notification related to the SMF registration event associated to the PDU session. Note that the H-SMF H-SMF1 may transmit the subscription request during the procedure of the UE establishing the PDU session with the HPLMN.

In an embodiment, the UDM may not always accept the SMF registration request (e.g. from the H-SMF H-SMF2) and may determine whether to accept/reject the received SMF registration request. For example, the UDM may determine whether to accept/reject the SMF registration request from the H-SMF H-SMF2 based on an indication of indicating whether the PDU session is the MA-PDU session and the received SMF registration request. In an embodiment, the indication of indicating whether the PDU session is the MA-PDU session is received from the H-SMF H-SMF1. In an embodiment, the indication of indicating whether the PDU session is the MA-PDU session is stored in the registration context of the PDU session in the UDM. In an embodiment, the UDM may refer to DNN configuration data and/or local policy for determining whether to accept/reject the SMF registration request from the H-SMF H-SMF2. When rejecting the SMF registration request from the H-SMF H-SMF2, the UDM transmits an appropriate SMF registration response to the H-SMF H-SMF2, so as to indicate the H-SMF H-SMF2 to release the PDU session (i.e. the second leg of the PDU session) with the UE. When accepting the SMF registration request from the H-SMF H-SMF2, the UDM transmits the notification (e.g. the SMF registration notification or the SMF deregistration notification shown in FIG. 7B) to the H-SMF H-SMF1, to indicate the H-SMF H-SMF1 release the PDU session (i.e. the first leg of the PDU session) with the UE.

Figure 8A:
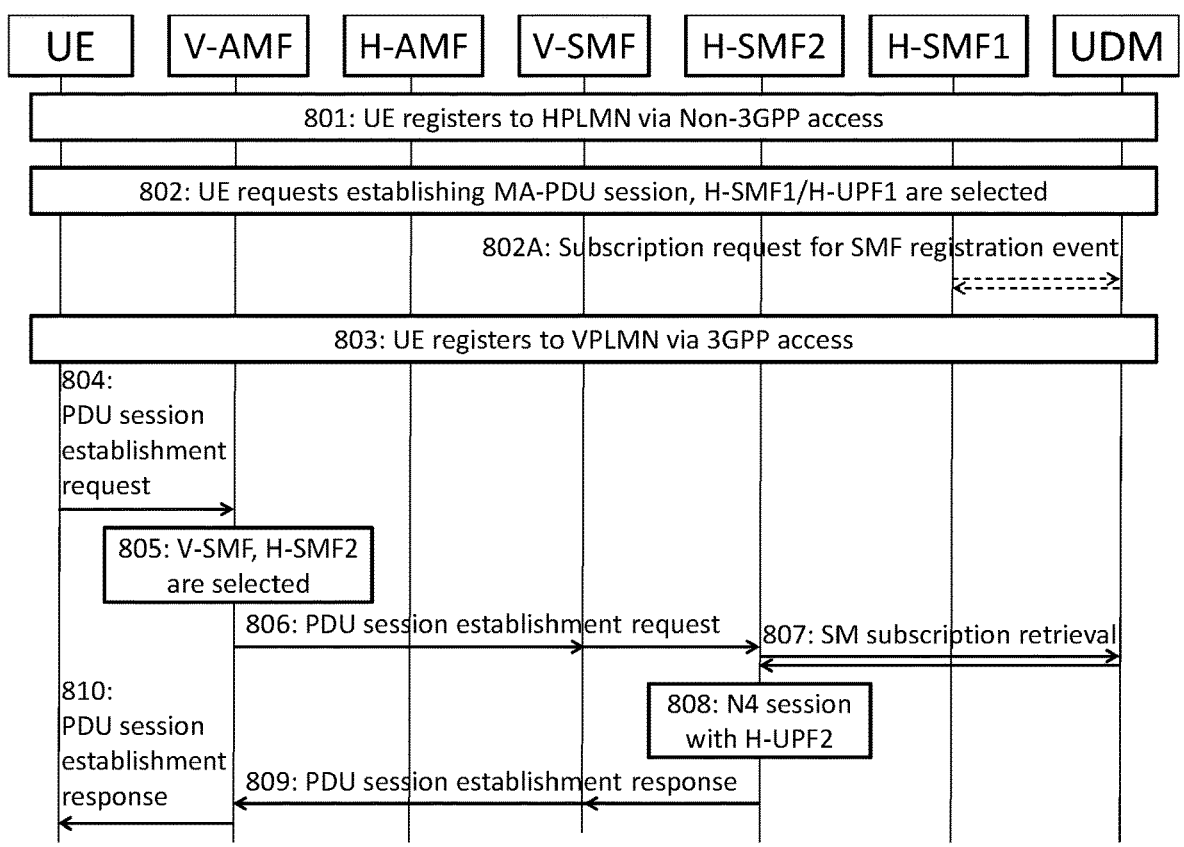
FIGS. 8A and 8B show an example of an MA-PDU session establishment procedure in the roaming scenario according to an embodiment of the present disclosure.
Figure 8B:
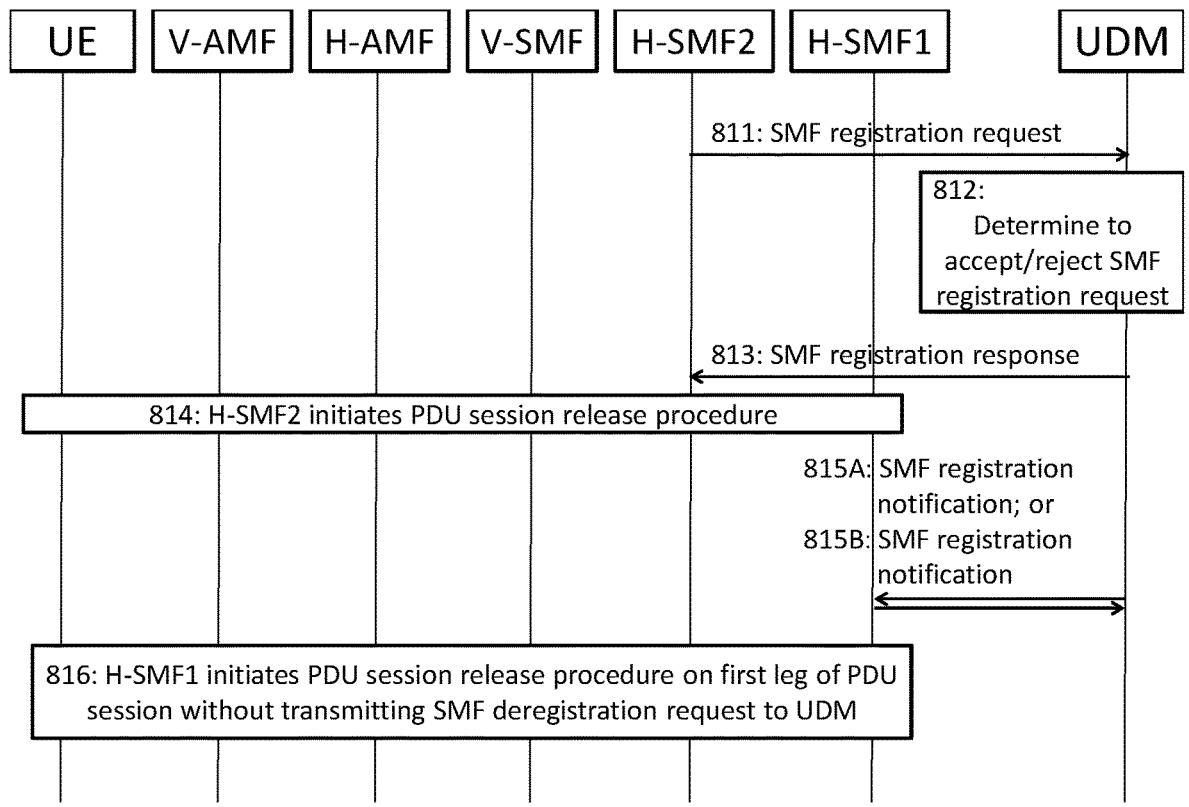

FIGS. 8A and 8B show an example of an MA-PDU session establishment procedure according to an embodiment of the present disclosure. In this embodiment, operations of steps 801 to 811 are similar to those of the steps 601 to 611 shown in FIGS. 6A and 6B and are not described herein for brevity.

In step 812, the UDM determines whether to accept or reject the SMF registration request received from the H-SMF H-SMF2 based on the indication of indicating whether the PDU session is the MA-PDU session and the received SMF registration request. In an embodiment, the UDM receives the indication of indicating whether the PDU session is an MA-PDU session from the H-SMF H-SMF1 and stores this indication in the registration context of the PDU session. For example, the H-SMF H-SMF1 may transmit this indication in the SMF registration request of establishing the first leg of the PDU session. For example, the H-SMF H-SMF1 may transmit the indication of indicating whether the PDU session is an MA-PDU in step 515 shown in FIG. 5B while performing step 802 shown in FIG. 8A to establish the first leg of the PDU session.

In an embodiment, the indication of indicating whether the PDU session is an MA-PDU session may comprise at least one of an MA-PDU indication or an MA-PDU downgrade allowed indication. The MA-PDU indication is configured to indicate the PDU session associated with the given PDU session ID is an MA-PDU session and the MA-PDU downgrade allowed indication is configured to indicate the PDU session associated to the given PDU session ID is allowed to be downgraded (changed) from an MA-PDU session to an SA-PDU session. Note that, the MA-PDU downgrade allowed indication also indicates that the PDU session associated with the given PDU session ID is an MA-PDU session.

In an embodiment, the UDM transmits SM subscription data including DNN configuration data to the H-SMF H-SMF1 and the H-SMF H-SMF1 determines (e.g. generates) the indication of indicating whether the PDU session is an MA-PDU based on the SM subscription data (e.g. the DNN configuration data). In an example, the DNN configuration data indicates whether the DNN (i.e. configuration of the DN) can be used to establish an MA-PDU session. In another example, the DNN configuration data indicates whether an MA-PDU session corresponding to the DNN can be downgraded to an SA-PDU session. In an embodiment, the UDM may transmit the SM subscription data (the DNN configuration data) in step 504 shown in FIG. 5A while establishing the first leg of the PDU session in step 802 shown in FIG. 8A.

In an embodiment, the H-SMF H-SMF1 determines the indication of indicating whether the PDU session is an MA-PDU session based on predefined local policy. In other words, even if the UDM does not transmit the SM subscription data (the DNN configuration data), the H-SMF H-SMF1 is still able to determine the indication of whether the PDU session is the MA-PDU session and to transmit this indication to the UDM.

In an embodiment, the UDM accepts the SMF registration request from the H-SMF H-SMF2 when determining that the indication from the H-SMF H-SMF1 indicates that (the first leg of) the PDU session is the MA-PDU session, the HPLMN supports downgrading an MA-PDU session to an SA-PDU session and the SMF registration request of the H-SMF H-SMF2 indicates that (the second leg of) the PDU session is an SA-PDU session. In an example, the indication from the H-SMF H-SMF1 indicates (the first leg) of the PDU session is an MA-PDU session when comprising the MA-PDU indication and/or the MA-PDU downgrade allowed indication. In an example, the SMF registration request of the H-SMF H-SMF2 indicates (the second leg of) the PDU session is an SA-PDU session when not containing any MA-PDU indication.

In an embodiment, the UDM rejects the SMF registration request from the H-SMF H-SMF2 when determining that the indication from the H-SMF H-SMF1 indicates that (the first leg of) the PDU session is an MA-PDU session, the HPLMN does not support downgrading the MA-PDU session to an SA-PDU session and the SMF registration request of the H-SMF H-SMF2 indicates that (the second leg of) the PDU session is an SA-PDU session. In an example, the indication from the H-SMF H-SMF1 indicates (the first leg of) the PDU session being an MA-PDU session when comprising the MA-PDU indication and/or the MA-PDU downgrade allowed indication. In an example, the SMF registration request of the H-SMF H-SMF2 indicates (the second leg of) the PDU session being an SA-PDU session when not containing any MA-PDU indication.

In an embodiment, the UDM accepts the SMF registration request from the H-SMF H-SMF2 when determining that the indication from the H-SMF H-SMF1 indicates that (the first leg of) the PDU session is an MA-PDU session, the indication from the H-SMF H-SMF1 (i.e. the MA-PDU downgrade allowed indication) indicates that (the first leg of) the PDU session can be downgraded from an MA-PDU session to an SA-PDU session and the SMF registration request of the H-SMF H-SMF2 indicates that (the second leg of) the PDU session is an SA-PDU session. In an example, the indication from the H-SMF H-SMF1 indicates (the first leg) of the PDU session is an MA-PDU session when comprising the MA-PDU indication and/or the MA-PDU downgrade allowed indication. In an example, the SMF registration request of the H-SMF H-SMF2 indicates (the second leg of) the PDU session being an SA-PDU session when not containing any MA-PDU indication.

In an embodiment, the UDM rejects the SMF registration request from the H-SMF H-SMF2 when determining that the indication from the H-SMF H-SMF1 indicates that (the first leg of) the PDU session is an MA-PDU session, the indication from the H-SMF H-SMF1 (i.e. the MA-PDU downgrade allowed indication) indicates that (the first leg of) the PDU session cannot be downgraded from an MA-PDU session to an SA-PDU session and the SMF registration request of the H-SMF H-SMF2 indicates that (the second leg of) the PDU session is an SA-PDU session. In an example, the indication from the H-SMF H-SMF1 indicates (the first leg) of the PDU session is an MA-PDU session when comprising the MA-PDU indication and/or the MA-PDU downgrade allowed indication. In an example, the SMF registration request of the H-SMF H-SMF2 indicates (the second leg of) the PDU session being an SA-PDU session when not containing any MA-PDU indication.

In an embodiment, the UDM may determine whether to accept or reject the SMF registration request from the H-SMF H-SMF2 based on the local policy when the UDM does not receive the indication of indicating whether (the first leg of) the PDU session is an MA-PDU session from the H-SMF H-SMF1. In this embodiment, the UDM may always accept or reject the SMF registration request from the H-SMF H-SMF2.

In an embodiment, steps 813 and 814 are performed when the UDM rejects the SMF registration request from the H-SMF H-SMF2 in step 812. In step 813, the UDM transmits the SMF registration response with a reject cause to the H-SMF H-SMF2. Based on such SMF registration response, the H-SMF H-SMF2 initiates a PDU session release procedure to release (the second leg of) the PDU session.

In an embodiment, steps 815A/815B and 816 are performed when the UDM accepts the SMF registration request from the H-SMF H-SMF2 in step 812. More specifically, after the SMF registration SMF registration request from the H-SMF H-SMF2 is received, the UDM transmits a notification to the H-SMF H-SMF1 to indicate that the PDU session is controlled by another SMF (e.g. H-SMF H-SMF2). In an example, the notification may be an SMF registration notification relating to the SMF registration event (step 815A) or an SMF deregistration notification (step 815B).

In an embodiment, the SMF registration notification of step 815A is configured to indicate the SMF registration event occurs. The SMF registration notification may comprise information related to the H-SMF H-SMF2. For example, the SMF registration notification may comprise the PDU session ID, the DNN and the SMF instance ID (i.e. the NF instance ID of the H-SMF H-SMF2). In an example, the SMF registration notification may further comprise an MA-PDU indication when the MA-PDU indication is provided in the SMF registration request from the H-SMF H-SMF2. In some other scenarios which are not limited to the problematic case addressed above, the control of an MA-PDU session might be handed over to another H-SMF which also supports the MA-PDU (e.g. from H-SMF H-SMF1 to the H-SMF H-SMF2 supporting the MA-PDU), the H-SMF H-SMF2 may include MA-PDU indication to the UDM in the SMF registration request. Therefore, the SMF registration notification to the H-SMF H-SMF1 may include an MA-PDU indication.

In an embodiment, the SMF deregistration notification of step 815B indicates that the PDU session needs to be released or that the PDU session is downgraded from MA-PDU session to SA-PDU session. In an example, the SMF deregistration notification may comprise a deregistration reason. For example, the deregistration reason may be "NEW_SMF_REGISTRATION" indicating a new SMF registration of the PDU session occurs or "MA_PDU_DOWNGRADE" indicating the PDU session downgrades (changes) from the MA-PDU session to the SA-PDU session.

In step 816, after receiving either the SMF registration notification of step 815A or the SMF deregistration notification of step 815B, the H-SMF H-SMF1 initiates a PDU session release procedure to release the PDU session established in step 802 (i.e. the first leg of the PDU session). Note that, the H-SMF H-SMF1 does not transmit the SMF deregistration request to the UDM. Therefore, the SMF registration context of the PDU session is not removed from and is still stored in the UDM.

In an embodiment, the H-SMF H-SMF1 may transmit a subscription request to the UDM, to subscribe a notification related to the SMF registration event associated to the PDU session (e.g. the SMF registration notification of step 815A). For example, the H-SMF H-SMF1 may transmit such subscription request in step 802A shown in FIG. 8A. That is, after the UE establishes the PDU session with the HPLMN, the H-SMF H-SMF1 transmits the subscription request to the UDM, to subscribe the SMF registration notification related to the SMF registration event associated to the PDU session. Note that, the H-SMF H-SMF1 may transmit the subscription request during the procedure of the UE establishing the PDU session with the HPLMN.

As shown in FIGS. 8A and 8B, the UDM does not receive the SMF deregistration request. Therefore, the SMF registration context is not removed and is still stored in the UDM. The issue of erroneously removing the registration context of the PDU session when the VPLMN does not support the MA-PDU session is solved.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a unified data management (UDM) function, comprising:
receiving, from a first session management function (SMF), a registration request of a packet data unit (PDU) session corresponding to a second SMF, and
transmitting, to the second SMF, a notification which indicates the PDU session is controlled by another SMF, wherein the notification indicates the second SMF to release the PDU session, wherein the notification relates to an SMF registration event associated to the PDU session and comprises an identification (ID) of the PDU session, a data network name (DNN), an ID of the first SMF.

2. The wireless communication method of claim 1, further comprising:

changing a registration context of the PDU session from indicating the second SMF to indicating the first SMF, wherein the notification indicates the registration context of the PDU session is changed from indicating the second SMF to indicating another SMF.

3. The wireless communication method of claim 1, wherein the notification further comprises a multi-access PDU (MA-PDU) indication of the registration request for indicating the PDU session being an MA-PDU session.

4. The wireless communication method of claim 1, further comprising:

receiving, from the second SMF, a subscription request for subscribing the notification related to the SMF registration event.

5. The wireless communication method of claim 1, wherein the notification is an SMF deregistration notification which indicates that the PDU session needs to be released or that the PDU session is downgraded from an MA-PDU session to a single access PDU (SA-PDU) session.

6. A wireless communication method for use in a second session management function (SMF) the wireless communication method comprising:

receiving, from a unified data management (UDM) function, a notification which indicates that a packet data session (PDU) of the second SMF is controlled by another SMF, and releasing the PDU session based on the notification, wherein the notification relates to an SMF registration event associated to the PDU session and comprises an identification (ID) of the PDU session, a data network name (DNN), an ID of the first SMF.

7. The wireless communication method of claim 6, wherein the notification indicates that a registration context of the PDU session is changed from indicating the second SMF to indicating another SMF.

8. The wireless communication method of claim 6, wherein the notification further comprises a multi-access PDU (MA-PDU) indication of the registration request for indicating the PDU session is a MA-PDU session.

9. The wireless communication method of claim 8, further comprising:

transmitting, to the UDM function, a subscription request for subscribing the notification related to the SMF registration event.

10. The wireless communication method of claim 6, wherein the notification is an SMF deregistration notification which indicates that the PDU session needs to be released or the PDU session is downgraded from an MA-PDU session to a single access PDU (SA-PDU) session.

11. A unified data management (UDM) function, comprising:

a communication unit, configured to:

receive, from a first session management function (SMF) a registration request of a packet data unit (PDU) session corresponding to a second SMF, and transmit, to the second SMF, a notification which indicates the PDU session is controlled by another SMF, wherein the notification indicates the second SMF to release the PDU session, wherein the notification relates to an SMF registration event associated to the PDU session and comprises an identification (ID) of the PDU session, a data network name (DNN), an ID of the first SMF.

12. A session management function (SMF), comprising:

a communication unit, configured to receive, from a unified data management (UDM) function, a notification which indicates that a packet data session (PDU) of the SMF is controlled by another SMF, and a processor, configured to release the PDU session based on the notification, wherein the notification relates to an SMF registration event associated to the PDU session and comprises an identification (ID) of the PDU session, a data network name (DNN), an ID of the first SMF.

* * * * *